(12) United States Patent
Maki (10) Patent No.: US 12,181,865 B2
(45) Date of Patent: Dec. 31, 2024

(54) OPERATING STATE CLASSIFICATION SYSTEM, AND OPERATING STATE CLASSIFICATION METHOD

(71) Applicant: Hitachi, Ltd., Tokyo (JP)

(72) Inventor: Kohji Maki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 17/801,922

(22) PCT Filed: Jul. 29, 2020

(86) PCT No.: PCT/JP2020/028986
§ 371 (c)(1),
(2) Date: Aug. 24, 2022

(87) PCT Pub. No.: WO2021/171647
PCT Pub. Date: Sep. 2, 2021

(65) Prior Publication Data
US 2023/0091068 A1    Mar. 23, 2023

(30) Foreign Application Priority Data
Feb. 27, 2020    (JP) .................................. 2020-031357

(51) Int. Cl.
*G05B 23/02*    (2006.01)
(52) U.S. Cl.
CPC ..... *G05B 23/0254* (2013.01); *G05B 23/0216* (2013.01)
(58) Field of Classification Search
CPC ............ G05B 23/0254; G05B 23/0216; G05B 23/024; G05B 23/0213; G06N 3/063; G06N 3/0455; G06N 3/09; G06N 3/098
See application file for complete search history.

(56) References Cited

U.S. PATENT DOCUMENTS

2018/0336463 A1*  11/2018  Bloom ..................... G06N 3/08
2021/0116901 A1*   4/2021  Yokoya ................ G05B 23/024

FOREIGN PATENT DOCUMENTS

| JP | 2013-077969 A | 4/2013 |
| JP | 2019-191869 A | 10/2019 |
| WO | WO-2018/011842 A1 | 1/2018 |

OTHER PUBLICATIONS

Komukai, Kohei et al., "Autoencoding communication for continual classifier updating in distributed recognition sensor networks, Transactions of Information Processing Society of Japan" Oct. 15, 2019, vol. 60, No. 10, pp. 1780-1795, ISSN: 1882-7764, particularly, [abstract], chapter I. to section 3.3.1, sections 5.1, 6.3.

(Continued)

*Primary Examiner* — Mohammad K Islam
(74) *Attorney, Agent, or Firm* — Foley & Lardner LLP (57) ABSTRACT

The objective of the present invention is to realize an operating state classification system having a classification accuracy that continuously improves through additional learning, and which is appropriately protected from unauthorized duplication of a classification function. In this operating state classification system, in which an edge device and a server are connected by means of a communication network, and which inputs sensor data into a neural network and outputs a state label: the edge device includes a first storage unit which stores an upstream side of the neural network, and a dimensionality reduction unit which inputs the sensor data into the upstream side of the neural network and outputs intermediate data; and the server includes a second storage unit which stores a downstream side of the neural network, an inference executing unit which inputs the intermediate data into the downstream side of the neural network and outputs the state label, and a (Continued)

learning unit which updates the downstream side of the neural network by means of additional learning.

9 Claims, 10 Drawing Sheets

(56) References Cited

OTHER PUBLICATIONS

English Translation of International Search Report Corresponding to International Application No. PCT JP/2020/028986 dated Oct. 20, 2020.

* cited by examiner

OPERATING STATE CLASSIFICATION SYSTEM, AND OPERATING STATE CLASSIFICATION METHOD

TECHNICAL FIELD

The present invention relates to an operating state classification system and an operating state classification method, which classify operating states of an edge device and the like.

BACKGROUND ART

One of problems in detecting abnormalities in factory equipment is the setting of appropriate criteria. For example, when diagnosing a machine tool, the load applied to a drive motor differs depending on the type of process (for example, the load is large during machining and the load is small during idling). Therefore, misinformation and information losing increase so long as the criteria different for each process are not set. Alternatively, in order to improve the accuracy of abnormality detection, it is also conceivable to use only data of a specific process or only data of a time zone in which a load fluctuation is small. Therefore, there is a demand for an operating state classification system capable of classifying an operating state of a target device before detecting an abnormality.

On the other hand, recently, it is becoming possible to equip an edge device such as a power conversion device, an industrial controller or the like with an inference execution function of deep learning (neural network). Therefore, if the edge device is equipped with an operating state classification function by using it, it is possible to determine the operating state by the edge device and transmit only the data used for abnormality detection to a server. Therefore, in addition to reducing the amount of communication data, more accurate abnormality detection becomes possible.

Figure 15:
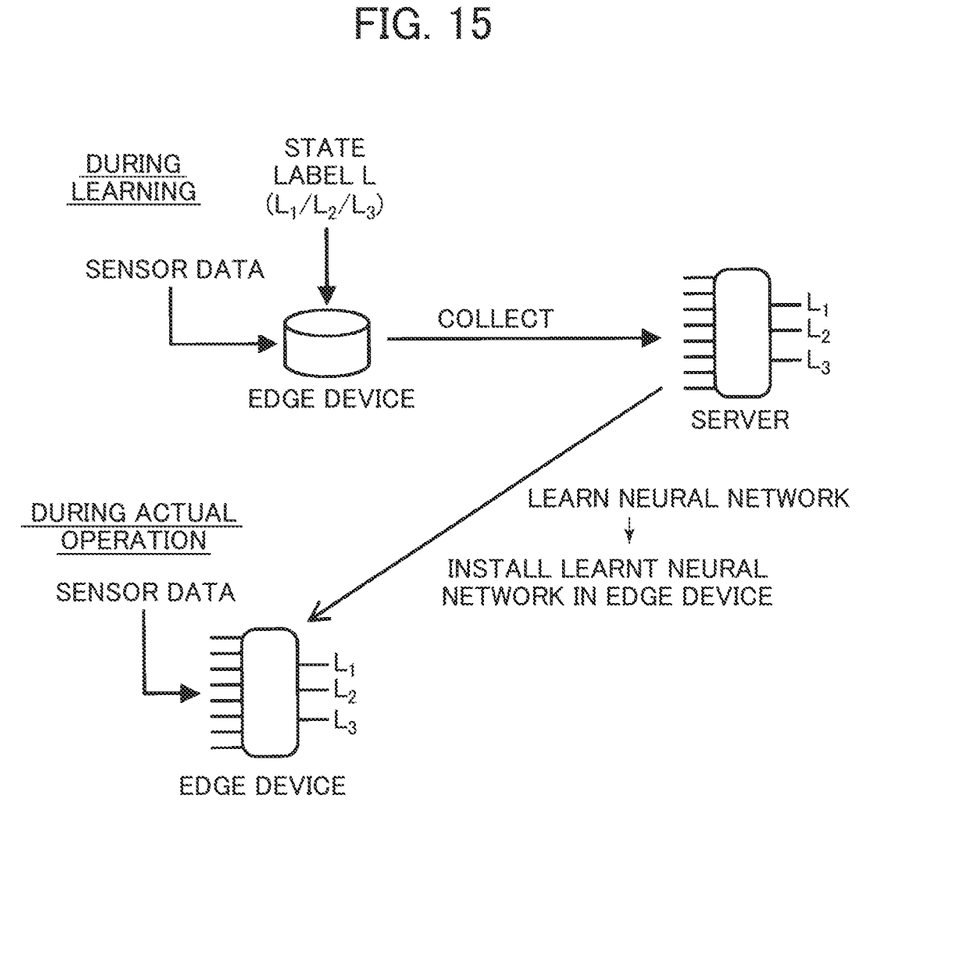
FIG. 15 is a conceptual diagram of a prior art related to an operating state classification system.

A conceptual diagram of such a prior art is shown in FIG. 15. First, in an edge device, data from various sensors and state labels L (for example, $L_1$, $L_2$, $L_3$) indicating each operating state are stored in association with each other. They are collected in a learning server by some method, and a neural network is learnt by the learning server. The thus-obtained learnt neural network is installed in the edge device. By doing so, the automation of the state classification is realized by the edge device alone. After that, processing according to the classification result, such as diagnosing only with data of a specific operating state is executed.

However, in various control devices like a power conversion device and an industrial controller, rather than the current edge device, particularly, a device which assumes edge computing like an industrial PC, the performance of the installed microcomputer is low and the storage is also low. Therefore, it is usually difficult to perform learning on a neural network.

Therefore, in the case of the operating state classification system based on the above-mentioned conventional technology, there is a problem that the function at the start of the actual operation is fixed and it is difficult to improve the classification accuracy through the actual operation. Further, since the function of the edge device alone is closed, there is a risk that the function of the neural network may be illegally duplicated by monitoring the input and the output.

Thus, there has been proposed a technology that utilizes the computing power of both the edge device and the server by dividing the neural network into the edge device and the server and mounting the same. For example, there has been disclosed in Patent Literature 1, a technology that a smartphone executes up to the processing of the first half of the neural network (from an input layer to the first half of an intermediate layer), outputs its result to the server, and performs the processing of the second half (from a second half of the intermediate layer to an output layer) on the server. Not only inference execution but also learning is executed in collaboration with the smartphone and the server.

CITATION LIST

Patent Literature

PTL 1: WO2018/011842

SUMMARY OF INVENTION

Technical Problem

There is however a problem that in various control devices like a power conversion device and an industrial controller, since the performance and storage of the microcomputer are inferior to those of the smartphone, it is difficult to execute the learning of the neural network by utilizing the technology disclosed in Patent Literature 1.

The present invention has been made to solve the above-mentioned problems of the prior art, and it is an object of the present invention to provide an operating state classification system capable of continuously improving the accuracy of operating state classification by additional learning while reducing the burden on the edge device side when an edge device and a server are made to cooperate with each other.

Solution to Problem

In order to solve the above problems, an operating state classification system of the present invention is an operating state classification system having an edge device and a server connected via a communication network, which inputs sensor data to a neural network and outputs a state label. The edge device includes a first storage unit which stores a pre-stage side of the neural network, and a dimension compression unit which inputs the sensor data to the pre-stage side of the neural network and outputs intermediate data. The server includes a second storage unit which stores a post-stage side of the neural network, an inference execution unit which inputs the intermediate data to the post-stage side of the neural network and outputs the state label, and a learning unit which updates the post-stage side of the neural network by additional learning.

Further, an operating state classification method of the present invention includes a learning step of learning a neural network inputting sensor data and outputting a state label on a server, a first storing step of storing a pre-stage side of the neural network in an edge device, a second storing step of storing a post-stage side of the neural network in the server, and an additional learning step of additionally learning the post-stage side of the neutral network on the server.

Advantageous Effects of Invention

According to the operating state classification system and the operating state classification method of the present invention, even when the neural network installed in the edge device does not evolve, the neural network on the server side evolves as the edge device continues to operate. Therefore, the classification accuracy of the entire system can be improved. Thus, the actual operation can be started without waiting for the learning data to be sufficiently accumulated. In addition, since the data to be communicated is dimensionally compressed, not only the communication cost can be reduced, but it is also unlikely to be misused even if the data is stolen during communication. Furthermore, since the edge device does not function unless it is connected to the server, unauthorized duplication can be suppressed.

DESCRIPTION OF EMBODIMENTS

Hereinafter, embodiments of the present invention will be described using the drawings.

First Embodiment

An operating state classification system 100 according to a first embodiment of the present invention will be described using FIGS. 1 to 7. The operating state classification system 100 of the present embodiment is a system which classifies an operating state of an edge device 2 through the use of a neural network, and is one in which a server 1 and the edge device 2 are connected by a communication network. Incidentally, in the present embodiment, a self-encoder is given as an example of the neural network, but the concept of the present invention may be applied to a system using other types of neural networks.

The server 1 is a computer equipped with hardware such as an arithmetic unit such as a CPU, a main storage device such as a semiconductor memory, an auxiliary storage device such as a hard disk, and a communication device. Further, the edge device 2 is a power conversion device, an industrial controller, or the like having a microcomputer built therein. Such a server 1 and an edge device 2 can realize each function to be described later by causing the arithmetic unit to execute a program loaded in the main storage device. Incidentally, it is assumed that the microcomputer of the edge device 2 has computing power to use the installed neural network, but does not have computing power to evolve the installed neural network by itself.

Hereinafter, the details of the operating state classification system 100 of the present embodiment will be described separately for each situation of "learning processing" performed before the actual operation of the edge device 2, "inference processing" performed during the actual operation of the edge device 2, and "additional learning processing" for improving the neural network on the server 1 side, which is performed after the operation of the edge device 2 for a predetermined period or more or a predetermined number of times or more.

<Learning Processing>

Figure 1:
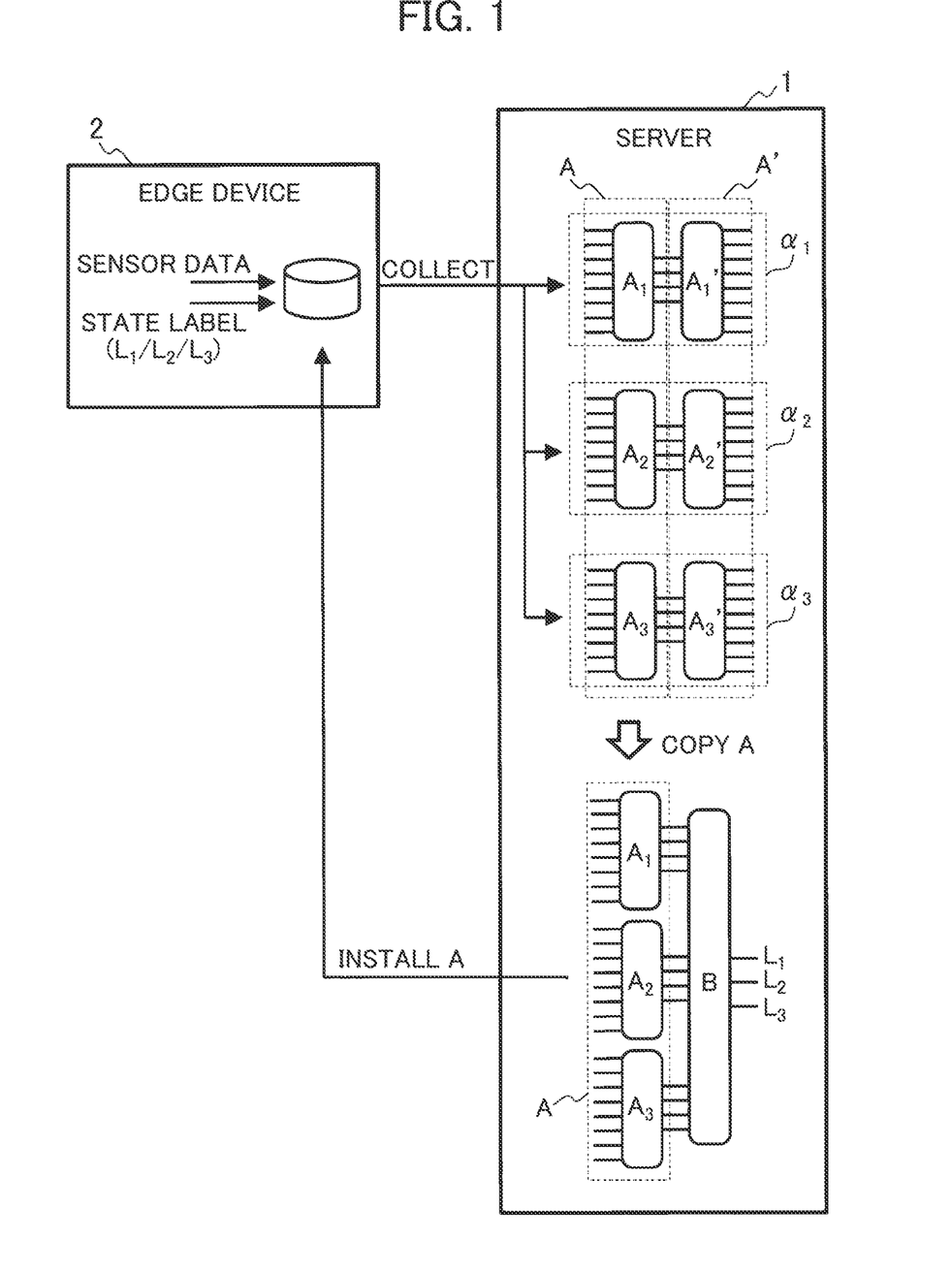
FIG. 1 is a conceptual diagram at the time of learning in an operating state classification system of a first embodiment.
Figure 2:
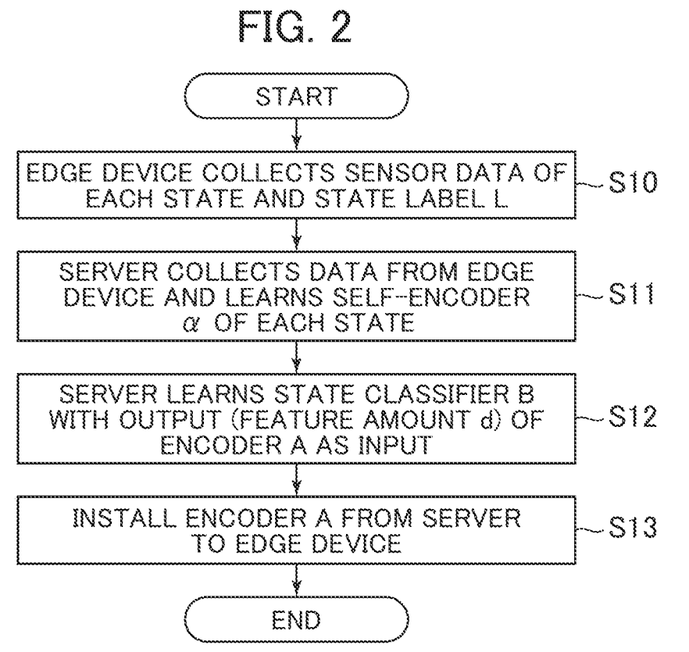
FIG. 2 is a flowchart at the time of learning in the operating state classification system of the first embodiment.

FIG. 1 is a conceptual diagram of the learning processing of the operating state classification system 100, which is performed before the actual operation of the edge device 2, and FIG. 2 is a flowchart showing the flow of the learning processing.

First, in Step S10, the edge device 2 stores sensor data detected by various sensors and a state label L (for example, $L_1$, $L_2$, $L_3$) indicating the type of an operating state, which is input by a system designer or the like in a storage device in association with each other. Incidentally, although there is illustrated here the case where the operating state is classified into three types, the type of the operating state may be any integer of 2 or more.

Next, in Step S11, the server 1 collects the sensor data and the state label L stored in the edge device 2 and uses the sensor data of each operating state to lean each neural network (hereinafter called a self-encoder α) self-reproducing them. For example, a self-encoder $α_1$ learned by the sensor data in the state label $L_1$ outputs the sensor data in the state label $L_1$ when the sensor data in the state label $L_1$ is input, but when sensor data other than that is input, outputs sensor data different from the input. Therefore, a pre-stage portion (from an input layer to the first half of an intermediate layer) of the self-encoder α serves as a neural network (hereinafter referred to as an encoder A) which extracts a feature amount d of the sensor data used for learning. Further, a post-stage portion (from the latter half of the intermediate layer to an output layer) of the self-encoder α serves as a neural network (hereinafter, referred to as a decoder A') which reproduces the sensor data, based on the feature amount d.

Next, in Step S12, the server 1 copies the encoder A obtained in Step S11 and learns a neural network (hereinafter called a state classifier B) which takes the feature amount d extracted by the encoder A as an input and outputs a state label L. Incidentally, since the feature amount d is extracted by the encoder A, the learning of the state classifier B is easy.

Finally, in Step S13, the server 1 installs only the learnt encoder A in the edge device 2. Incidentally, since the encoder A installed in the edge device 2 is a part of the neural network of the self-encoder α, a calculation load at the time of execution is small and a storage capacity is also small. Therefore, even if the edge device 2 is a built-in microcomputer having relatively constant low performance, desired processing can be executed without delay.

<Inference Processing>

Figure 3:
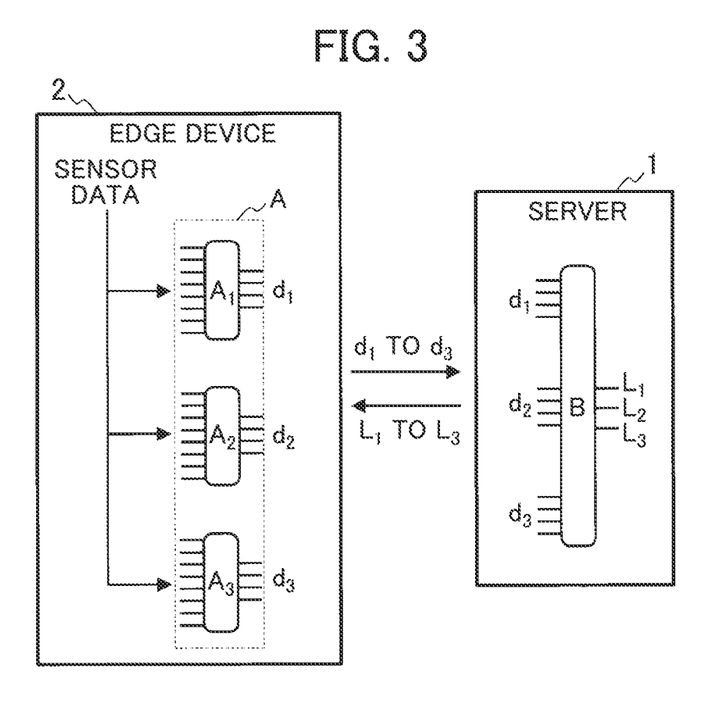
FIG. 3 is a conceptual diagram at the time of inference execution in the operating state classification system of the first embodiment.
Figure 4:
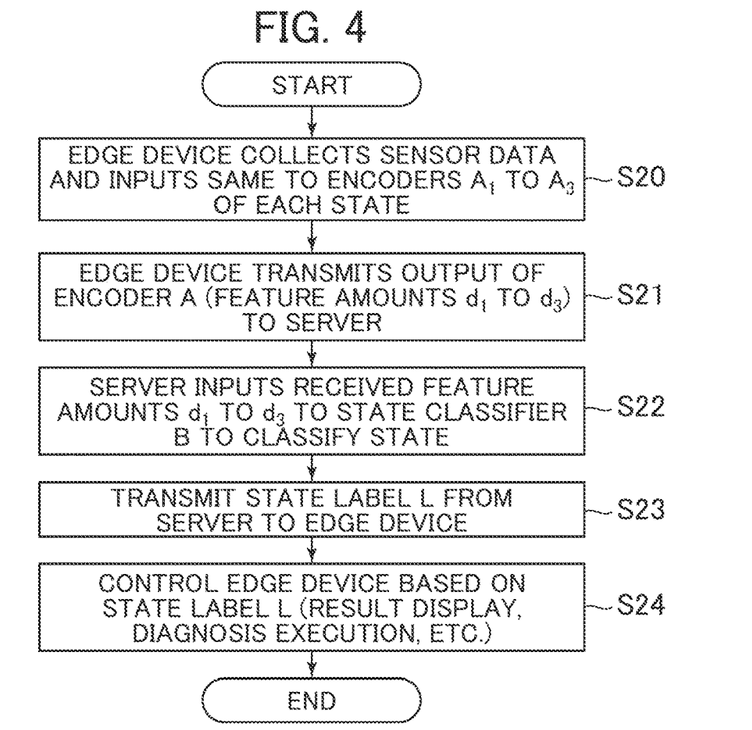
FIG. 4 is a flowchart at the time of inference execution in the operating state classification system of the first embodiment.

FIG. 3 is a conceptual diagram of the inference processing of the operating state classification system 100, which is executed during the actual operation of the edge device 2, and FIG. 4 is a flowchart showing the flow of the inference processing.

In Step S20, the edge device 2 inputs sensor data collected by various sensors during the actual operation to encoders $A_1$ to $A_3$ of each state, and extracts feature amounts $d_1$ to $d_3$ of each state.

In Step S21, the edge device 2 transmits the obtained feature amount d to the server 1. Since the feature amount d is dimensionally compressed by the encoder, the data size becomes small while including the features of the sensor data of each operating state. Therefore, it is possible to suppress the communication cost from the edge device 2 to the server 1.

In Step S22, the server 1 inputs the received feature amount d to the state classifier B to classify the operating state, and generates the state label L.

In Step S23, the server 1 transmits the generated state label L to the edge device 2.

Finally, in Step S24, the edge device 2 changes the subsequent processing method according to the type of the input state label L. For example, it is conceivable to display a classification result, execute diagnosis only in the case of a specific state, or store detailed data, etc. When it is necessary to immediately reflect a change in the operating state in the control of the edge device 2, it is desirable to utilize a high-speed, low-delay communication network as the communication network connecting the server 1 and the edge device 2.

Incidentally, the feature amount d transmitted from the edge device 2 to the server 1 is intermediate data output by the encoder A, which is the pre-stage portion of the self-encoder α. If the decoder A' which is the post-stage portion of the self-encoder α and the state classifier B cannot be used, it is meaningless data. Therefore, even if the communication from the edge device 2 to the server 1 is intercepted, the confidentiality of its communication content can be maintained.

<Additional Learning Processing>

Figure 5:
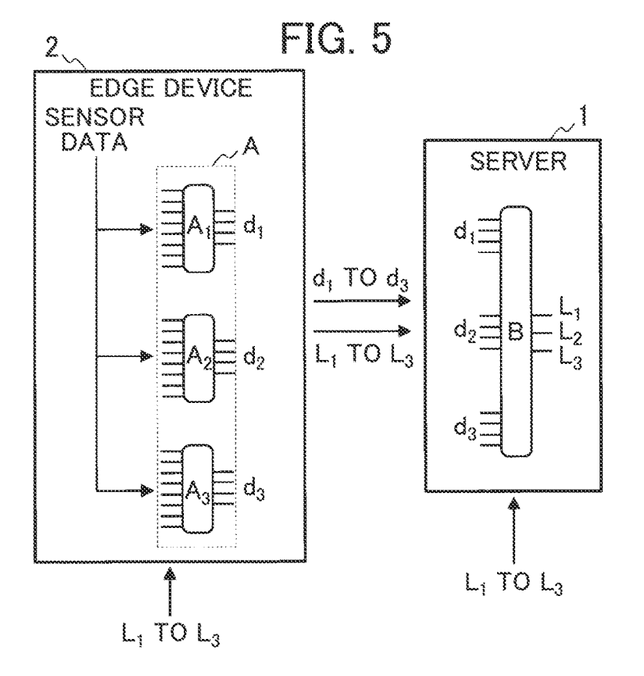
FIG. 5 is a conceptual diagram at the time of additional learning in the operating state classification system of the first embodiment.
Figure 6:
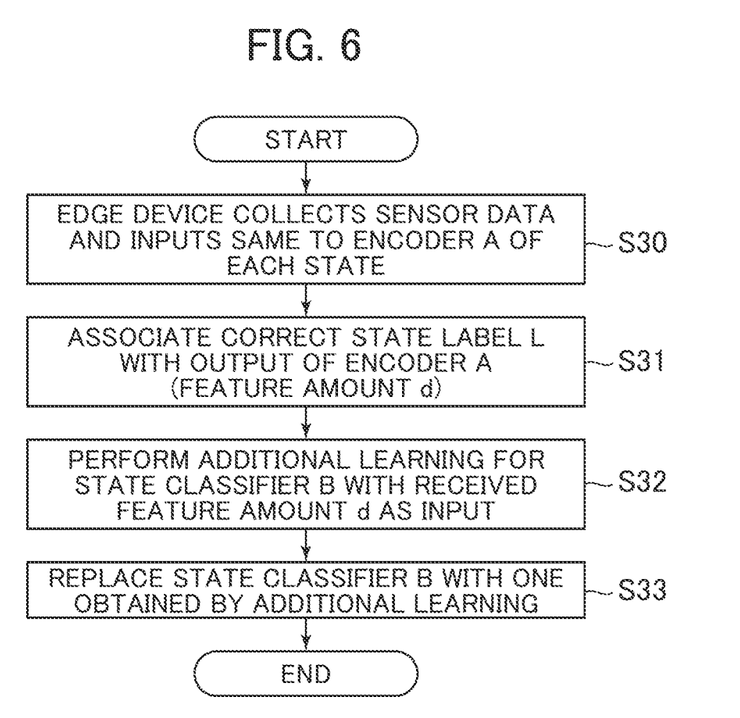
FIG. 6 is a flowchart at the time of additional learning in the operating state classification system of the first embodiment.

FIG. 5 is a conceptual diagram of the additional learning processing of the operating state classification system 100, which is performed after the edge device 2 has been operated for a predetermined period or more or a predetermined number of times or more, and FIG. 6 is a flowchart showing the flow of the additional learning processing. Incidentally, the additional learning processing is learning processing for improving the state classifier B on the server 1 side, and the encoder A on the edge device 2 side continues to be used as it is.

In Step S30, the edge device 2 inputs sensor data collected by various sensors during the actual operation to the encoders $A_1$ to $A_3$ of each state, and extracts feature amounts $d_1$ to $d_3$ of each state.

In Step S31, the correct state label L is associated with the same intermediate data as in the inference execution and stored in the server 1 as additional learning data. The assignment of the correct state label L and the correction of the incorrect state label L are basically executed by a human being such as a system designer or an operator of the edge device 2. Note that FIG. 5 illustrates both the correct state label L input to the server 1 by the system designer and the like and the correct state label L input to the edge device 2 by the operator, but either one of them may be input.

Alternatively, in order to save time and labor for attaching the correct state label by the human being, when the probability of the state determined to be the most probable in the classification by the state classifier B is higher than the preset value (for example, 80%), the state label may automatically be given as the correct state label. On the other hand, only when the probability is less than or equal to the preset value, that is, when the state classifier B is uncertain about the judgment, it is possible to save the trouble that the human being always performs the work of giving the correct state label by urging the human being to give the correct state label. Incidentally, when the human being completely stops giving state labels and the probability is low, state labels may be given using the proximity to labeled data as an index, or they may not be used for additional learning.

In Step S32, the server 1 performs additional learning when it has accumulated a certain amount or more of additional learning data. This additional learning may be executed in parallel with the inference execution shown in FIGS. 3 and 4, or the inference execution may be temporarily suspended and executed.

Then, in Step S33, the server 1 temporarily suspends the inference execution and replaces the state classifier B with one obtained by the additional learning. Consequently, after the edge device 2 has been operated for a predetermined period or more or a predetermined number of times or more, the state classifier B of the server 1 can be updated to one with higher classification accuracy on the basis of human knowledge. Therefore, even if the encoder A installed in the edge device 2 does not evolve, the performance of the system as a whole is improved, so that a more appropriate state label L can be generated in inference processing executed thereafter.

<Specific Configuration of Server 1 and Edge Device 2>

Figure 7:
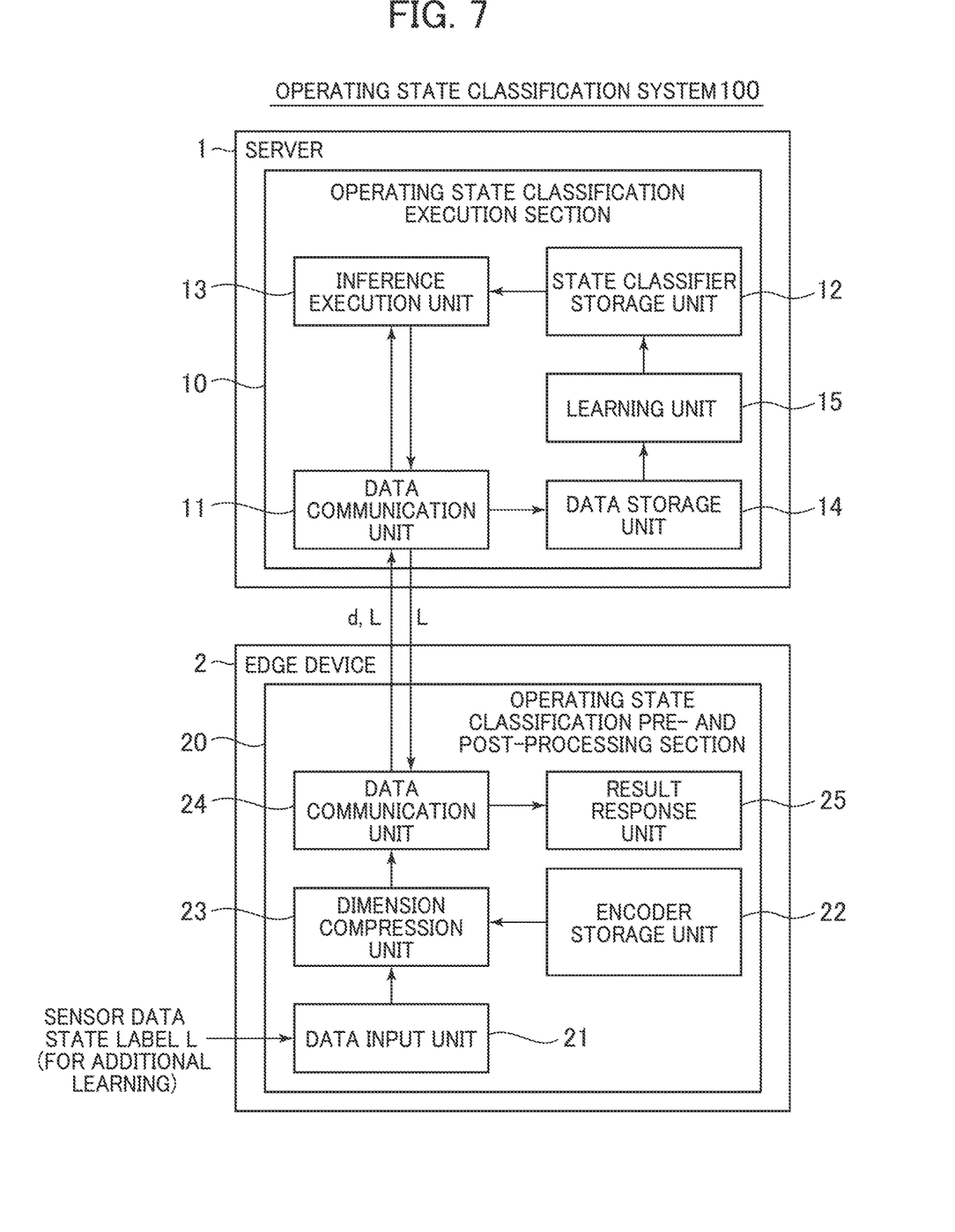
FIG. 7 is a functional configuration diagram of an edge device and a server in the operating state classification system of the first embodiment.

FIG. 7 is a functional block diagram of the server 1 and the edge device 2 in the operating state classification system 100 which performs each of the above processing.

An operating state classification pre- and post-processing section 20 included in the edge device 2 includes a data input unit 21 which inputs sensor data and a state label for additional learning, an encoder storage unit 22 which stores the learnt encoder A, a dimension compression unit 23 which converts the sensor data into the feature amount d by using the encoder A, a data communication unit 24 which transmits the feature amount d to the server 1 and receives the state label L from the server 1, and a result response unit 25 which displays the state label L and executes diagnosis and stores detailed data only in the case of a specific state. Incidentally, as described above, these are realized by the CPU or the like executing the program.

On the other hand, an operating state classification execution section 10 included in the server 1 includes a data communication unit 11 which receives the feature amount d and the state label L for additional learning from the edge device 2, and transmits the state label L being the classification result by the state classifier B, a state classifier storage unit 12 which stores the learnt state classifier B, an inference execution unit 13 which executes operating state classification using the state classifier B, a data storage unit 14 which stores data for additional learning, and a learning unit 15 which learns the self-encoder α and the state classifier B at the time of learning processing or additional learning processing using the stored data. Incidentally, as described above, these are realized by the CPU or the like executing the program.

By configuring the system as in the present embodiment, the additional learning data is naturally accumulated in the server 1 just by continuing the actual operation. Therefore, even if the classification accuracy of the operating state is insufficient at the end of the first learning processing, the classification accuracy gradually improves with the passage of time. Also, since the data sent from the edge device 2 to the server 1 is dimensionally compressed, the amount of communication can be suppressed. Further, useful information (state label L) cannot be obtained unless an environment in which the edge device 2 is connected to the server 1 to enable the use of the state classifier B is constructed. Therefore, the risk of information leakage is small and in addition to that, even if only the encoder A is copied improperly, it has almost no utility value.

According to the present embodiment described above, even when the neural network installed on the edge device side does not evolve, the neural network on the server side continuously evolves by the additional learning. Therefore, the longer the operation time, the better the performance of the neural network as the entire system. Further, since the feature amount (intermediate data) having a small amount of data is transmitted from the edge device to the server during the actual operation, the amount of communication between the two can be suppressed. In addition, since the system cannot process the feature amount (intermediate data) unless the edge device and the server are connected, it is possible to reduce the motivation to illegally duplicate the neural network on the edge device side and install it in other edge devices.

Second Embodiment

Next, inference processing of an operating state classification system 100 according to a second embodiment of the present invention will be described using a conceptual diagram of FIG. 8. Incidentally, in terms of the common points with the first embodiment, dual description will be omitted.

As shown in FIGS. 3 and 4, the inference processing of the first embodiment is the processing in which the state classifier B generates the state label L, but the inference processing of the present embodiment is characterized in that in addition to this processing, the post-stage portion of the self-encoder (decoder A') obtained as a by-product during the learning processing of FIGS. 1 and 2 is utilized, and the sensor data is reproduced on a pseudo basis, based on the feature amount d from the edge device 2.

For example, when the output of the state classifier B of the server 1 is a state label $L_1$, a feature amount $d_1$ is input to a decoder $A_1'$, when the output thereof is a state label $L_2$, a feature amount $d_2$ is input to a decoder $A_2'$, and when the output thereof is a state label $L_3$, a feature amount $d_3$ is input to a decoder $A_3'$. By doing so, it is possible to decode data close to the sensor data (hereinafter referred to as reproduced data) before being dimensionally compressed by the edge device 2. That is, the server 1 can pseudo-reproduce the sensor data large in data amount only by transmitting the feature amount d small in data amount from the edge device 2.

The reproduced data obtained as described above can be used for various purposes. For example, it may be used for abnormality detection by a complicated machine learning algorithm which is difficult to be mounted on an edge device, or it may be used to simply re-learn an encoder mounted on the edge device.

Third Embodiment

Next, description will be made about learning processing and inference processing of an operating state classification system 100 according to a third embodiment of the present invention using FIGS. 9 to 12. Incidentally, in terms of common points with the above embodiments, dual description will be omitted.

<Learning Processing>

Figure 9:
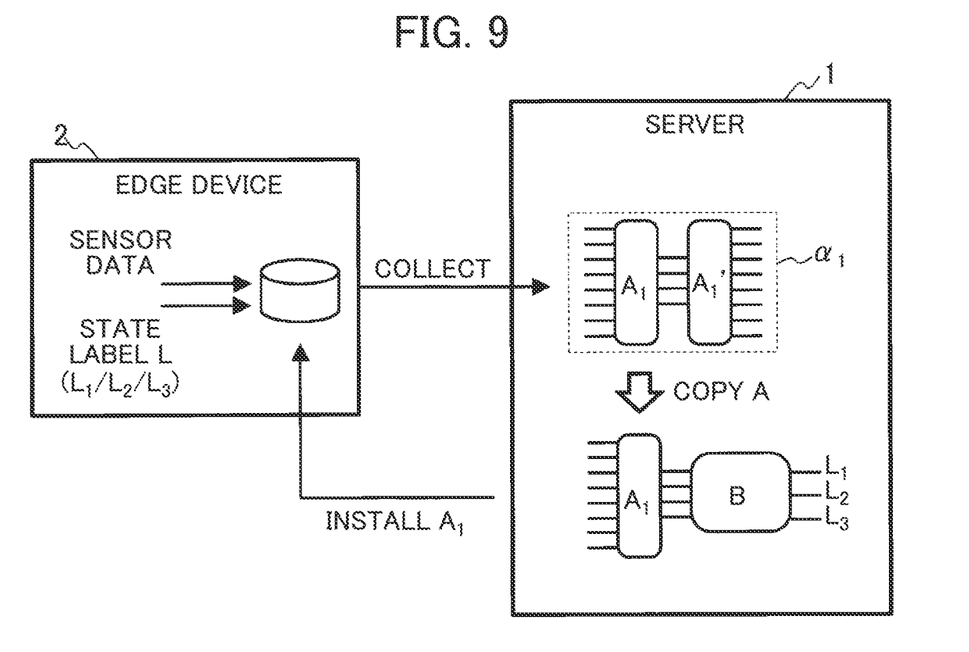
FIG. 9 is a conceptual diagram at the time of learning in an operating state classification system of a third embodiment.
Figure 10:
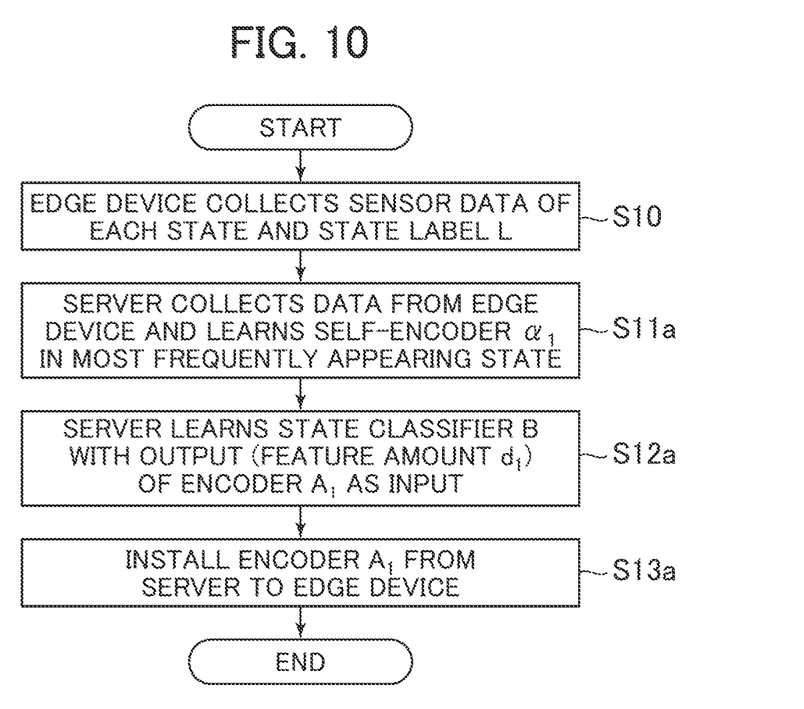
FIG. 10 is a flowchart at the time of learning in the operating state classification system of the third embodiment.

In the learning processing of the first embodiment, as shown in FIGS. 1 and 2, after learning the plurality of self-encoders $α_1$ to $α_3$, all encoders $A_1$ to $A_3$ being their pre-stage portions are installed in the edge device 2, but the learning processing of the present embodiment is characterized in that as shown in a conceptual diagram of FIG. 9 and a flowchart of FIG. 10, only one self-encoder $α_1$ is learnt, and an encoder $A_1$ being its pre-stage portion is installed in the edge device 2. By doing so, even when the storage capacity of the edge device 2 is small and all the encoders A cannot be stored, the mounting thereof becomes possible.

Further, in the learning processing of the first embodiment, as shown in FIGS. 1 and 2, the state classifier B which generates the state labels $L_1$ to $L_3$, based on the feature amounts $d_1$ to $d_3$ being the outputs of the encoders $A_1$ to $A_3$ is learnt, but the learning processing of the present embodiment is characterized in that as shown in FIGS. 9 and 10, a state classifier B which generates state labels $L_1$ to $L_3$, based on only a feature amount $d_1$ being the output of an encoder $A_1$ is learnt.

For example, when the frequency of generation of the operating state corresponding to the state label $L_1$ is extremely higher than that of other operating states (for example, the state label $L_1$ corresponds to the normal state, and the state labels $L_2$ and $L_3$ correspond to the abnormal state, respectively), there is a possibility that at the time of starting the actual operation, the abnormal data corresponding to the state label $L_2$ and the state label $L_3$ cannot be sufficiently collected. At that time, only the learning of the self-encoders $α_1$ corresponding to the state label $L_1$ is executed without executing the learning of the self-encoders $α_2$ and $α_3$ corresponding to the state label $L_2$ and the state label $L_3$. In this case, by taking measures such as taking more time off to learn the state classifier B and increasing the number of layers of the state classifier B, not only the state label $L_1$ corresponding to the normal state but also the state label $L_2$ and the state label $L_3$ corresponding to the abnormal state can be generated from the feature amount $d_1$ being the output of the self-encoder $α_1$.

Therefore, in Step S10 of FIG. 10, similarly to the first and second embodiments, the edge device 2 stores sensor data from various sensors and state labels (for example, $L_1$, $L_2$, $L_3$) indicating each operating state in association with each other.

Next, in Step S11a, the server 1 selects the state with the highest frequency of occurrence (here, normal state=state label 1) and learns using data of that state, the self-encoder $\alpha_1$ to reproduce it.

Further, in Step S12a, the server 1 copies the encoder $A_1$ obtained in the learning of Step S11a and learns the state classifier B outputting the state labels $L_1$ to $L_3$ with the feature amount $d_1$ extracted by the encoder $A_1$ as the input.

In addition, finally, in Step S13a, the server 1 installs only the learnt encoder $A_1$ in the edge device 2.

<Inference Processing>

Figure 11:
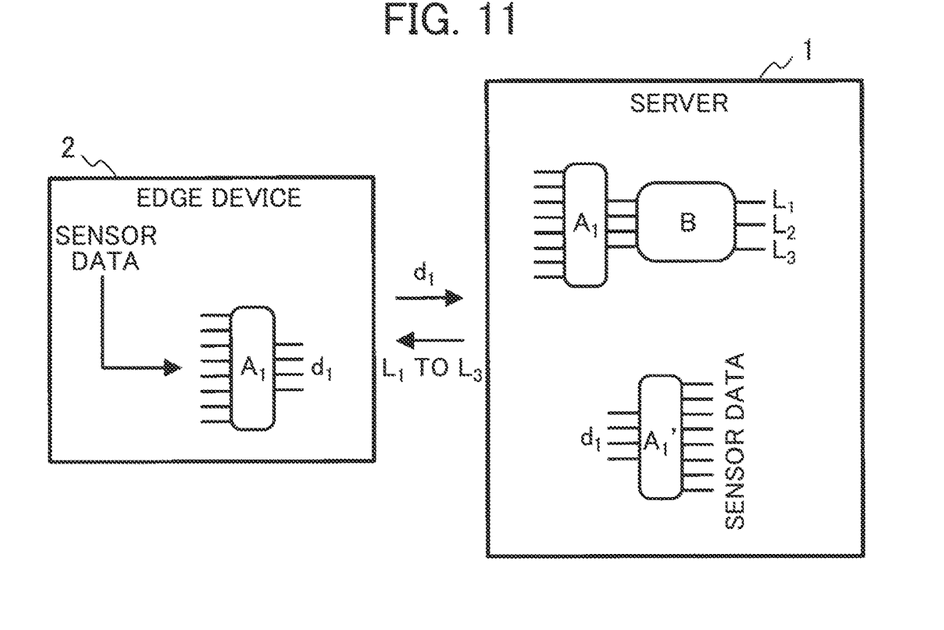
FIG. 11 is a conceptual diagram at the time of inference execution in the operating state classification system of the third embodiment.
Figure 12:
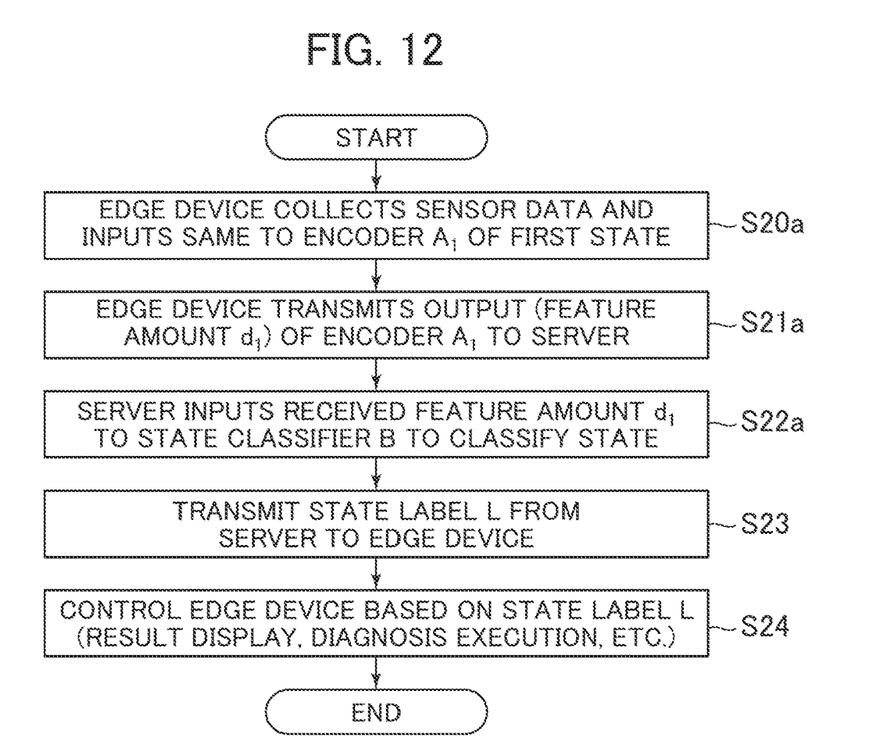
FIG. 12 is a flowchart at the time of inference execution in the operating state classification system of the third embodiment.

FIG. 11 is a conceptual diagram of the inference processing in the present embodiment, and FIG. 12 is a flowchart showing the flow of the inference processing.

In the first embodiment, as shown in FIGS. 3 and 4, the feature amounts $d_1$ to $d_3$ are transmitted from the edge device 2 to the server 1, but in the present embodiment, as shown in FIGS. 11 and 12, only the feature amount $d_1$ is transmitted from the edge device 2 to the server 1.

Figure 8:
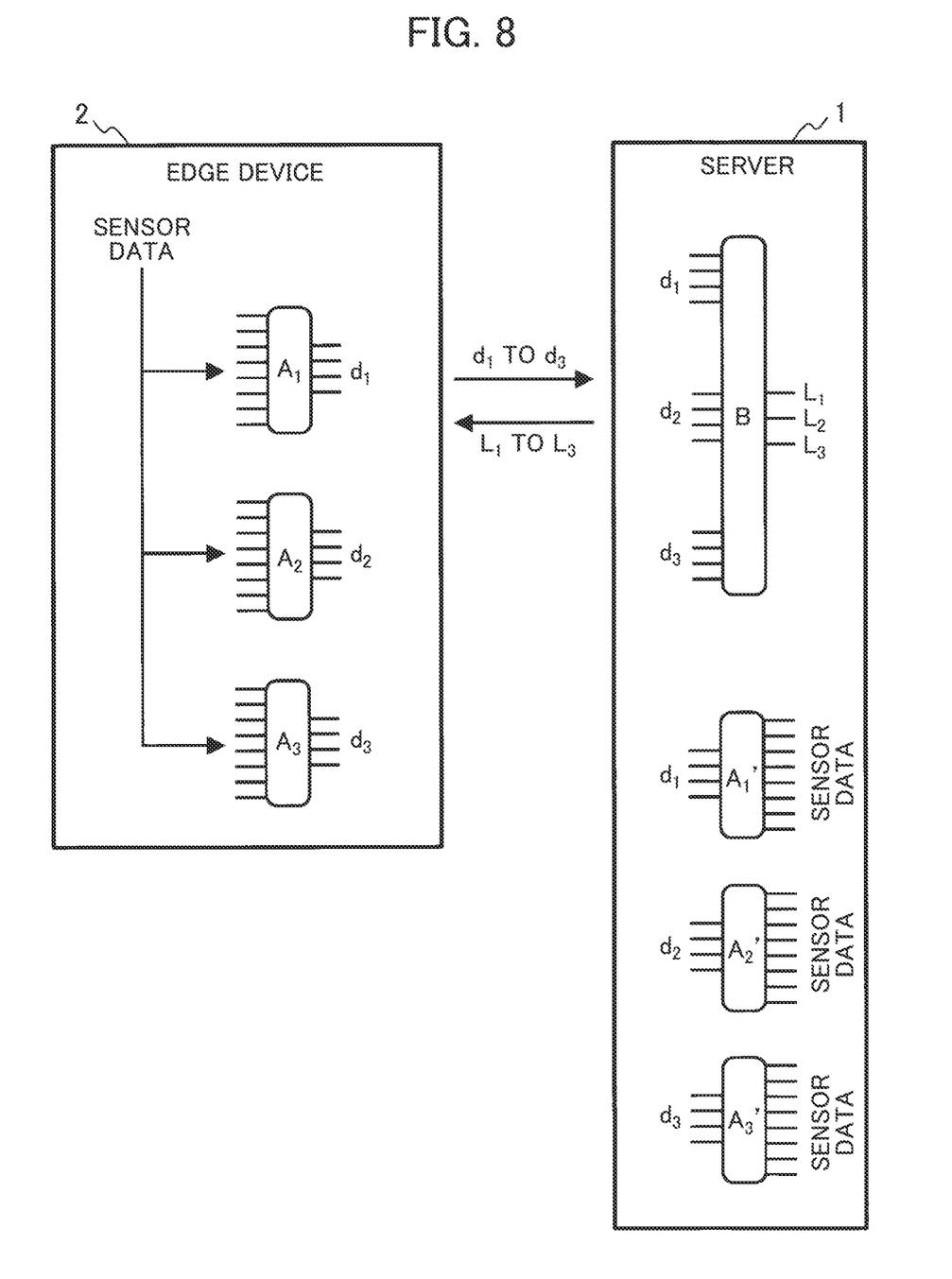
FIG. 8 is a conceptual diagram at the time of inference execution in an operating state classification system of a second embodiment.

Further, in the second embodiment, as shown in FIG. 8, the decoder A' is properly used according to the state label L output by the state classifier B, and the reproduced data corresponding to the state label L is generated. However, in the present embodiment, only when the state classifier B has output the state label $L_1$, the feature amount $d_1$ is input to the decoder $A_1'$, and the reproduced data close to the sensor data corresponding to the state label $L_1$ is output. The obtained data can be utilized for more accurate control and the like as in the second embodiment.

Figure 13:
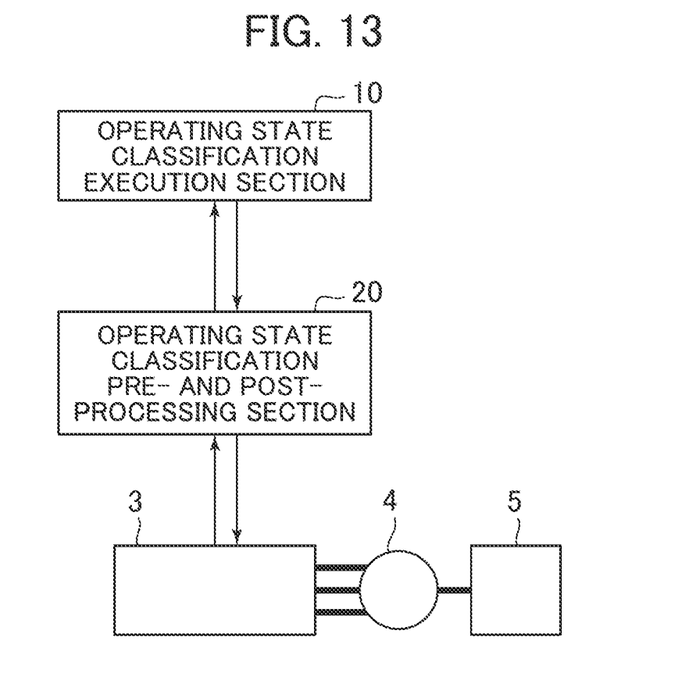
FIG. 13 is a basic configuration diagram when functions on the edge device side constituting an operating state classification system according to the present invention are built in an industrial controller.

FIG. 13 is a basic configuration diagram when the operating state classification pre- and post-processing section 20 of FIG. 7 is built in an industrial controller (programmable logic controller (PLC), sequencer, etc.) which is a kind of edge device 2. In addition to the above-described configuration, there are provided a power conversion device 3, a motor 4, and a load machine 5. Incidentally, dual description will be omitted for the common points with the above embodiments.

Since the industrial controller usually has a communication function with a higher-level system such as the server 1, it is possible to reduce the introduction cost of the operating state classification system 100 if the communication function is utilized. Further, since various data from a plurality of devices to be controlled are collected in the industrial controller, there is an advantage that it is easy to construct and mount a network which inputs data of such a plurality of devices. In addition, it is also naturally feasible to reflect the obtained classification results in the control of a plurality of devices to be controlled.

Fifth Embodiment

Figure 14:
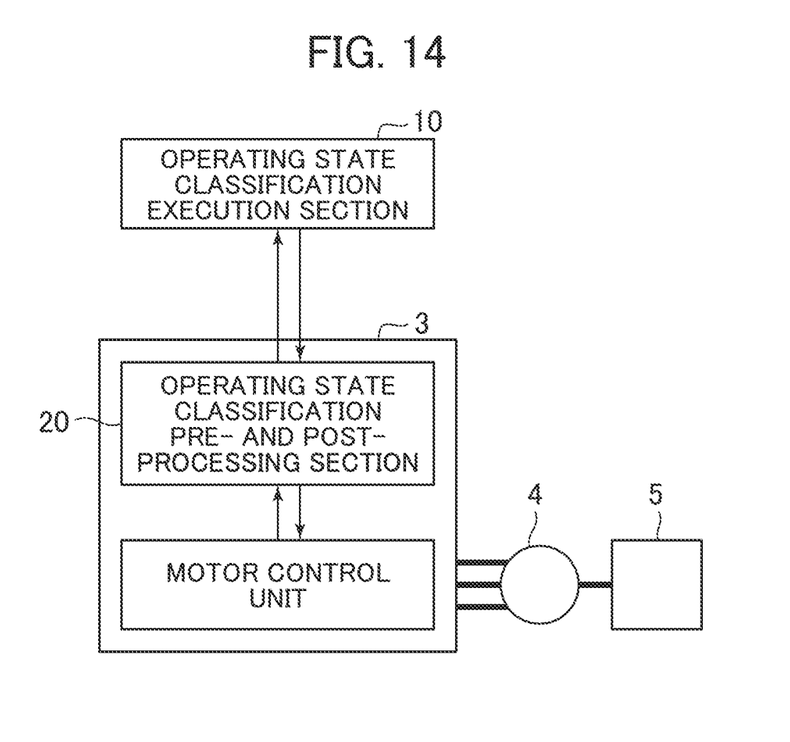
FIG. 14 is a basic configuration diagram when the functions on the edge device side constituting the operating state classification system according to the present invention are built in a power conversion device.

FIG. 14 is a basic configuration diagram when the operating state classification pre- and post-processing section 20 of FIG. 7 is built in the power conversion device 3 (general-purpose inverter, servo amplifier, DCBL controller, etc.). Incidentally, dual description will be omitted for the common points with the above embodiments.

By incorporating the present function in the power conversion device 3, various parameters used for motor control, which are not normally taken out from the inside of the power conversion device, can be input to the operating state classification system 100. In addition, there is an advantage that if the collection of various data is closed inside the power conversion device, the sampling speed can be increased without depending on the communication speed, so that it is possible to use data which captures faster physical phenomena for operating state classification. Furthermore, it is possible to cut out detailed data for a very short time from the obtained classification results and use it for diagnosis or save it, and it is also possible to issue a command to the motor control unit and immediately reflect it in the motor control.

Although the embodiments have been described above, the present invention is not limited to the above-mentioned embodiments, and includes various modifications. For example, the above-described embodiments have been described in detail in order to explain the present invention in an easy-to-understand manner, and are not necessarily limited to those having all the described configurations. Further, it is possible to replace a part of the configuration of one embodiment with the configuration of another embodiment, and it is also possible to add the configuration of another embodiment to the configuration of one embodiment. In addition, it is also possible to apply addition/deletion/replacement of another configuration with respect to a part of the configuration of each embodiment.

Further, the present invention is also applicable to industrial equipment incorporating a power conversion device therein such as an industrial robot, a machine tool, an air compressor, and a transfer table, a wind power generating system, a hybrid vehicle, an electric vehicle, a fuel cell vehicle, a railroad vehicle, and the like.

LIST OF REFERENCE SIGNS

1 . . . server, 10 . . . operating state classification execution section, 11 . . . data communication unit, 12 . . . state classifier storage unit, 13 . . . inference execution unit, 14 . . . data storage unit, 15 . . . learning unit, 2 . . . edge device, 20 . . . operating state classification pre- and post-processing section, 21 . . . data input unit, 22 . . . encoder storage unit, 3 . . . power conversion device, 4 . . . motor, 5 . . . load machine, $\alpha$, $\alpha_1$, $\alpha_2$, $\alpha_3$ . . . self-encoder, A, $A_1$, $A_2$, $A_3$ . . . encoder, A', $A_1'$, $A_2'$, $A_3'$ . . . decoder, B . . . state classifier, d, $d_1$, $d_2$, $d_3$ . . . feature amount (intermediate data), L, $L_1$, $L_2$, $L_3$ . . . state label.

The invention claimed is:

1. An operating state classification system having an edge device and a server connected via a communication network, which inputs sensor data to a neural network and outputs a state label,
wherein the edge device includes:
a first storage device which stores a pre-stage side of the neural network, and
a dimension compression system which inputs the sensor data to the pre-stage side of the neural network and outputs intermediate data, and
wherein the server includes:
a second storage device which stores a post-stage side of the neural network,
an inference execution system which inputs the intermediate data to the post-stage side of the neural network and outputs the state label, and
a learning system which updates the post-stage side of the neural network by additional learning;
wherein the pre-stage side of the neural network stored in the edge device is an encoder which is a pre-state portion of a self-encoder learnt for each state to be classified, and wherein the post-stage side of the neural network stored in the server is a state classifier which inputs intermediate data output by the encoder and outputs the state label.

2. The operating state classification system according to claim 1, wherein the learning system performs additional learning of the post-stage side of the neural network, based on the intermediate data stored in the server and the correct state label associated with the intermediate data.

3. The operating state classification system according to claim 2, wherein when the probability of the state determined by the inference execution system to be the most probable is higher than a preset value, the correct state label is a state label output by the neural network.

4. The operating state classification system according to claim 2, wherein when the probability of the state determined by the inference execution system to be the most probable is lower than a preset value, the correct state label is a state label input by a human being.

5. The operating state classification system according to claim 1, wherein a decoder which is a post-stage portion of the self-encoder is also stored in the server.

6. The operating state classification system according to claim 1, wherein the edge device is an industrial controller or a power conversion device.

7. An operating state classification method comprising:
a learning step of learning a neural network inputting sensor data and outputting a state label on a server;
a first storing step of storing a pre-stage side of the neural network in an edge device, wherein the pre-stage side of the neural network stored in the edge device is an encoder which is a pre-state portion of a self-encoder learnt for each state to be classified;
a second storing step of storing a post-stage side of the neural network in the server, and wherein the post-stage side of the neural network stored in the server is a state classifier which inputs intermediate data output by the encoder and outputs the state label;
a third storing step of storing a decoder which is a post-stage portion of the self-encoder is also stored in the server; and
an additional learning step of additionally learning the post-stage side of the neutral network on the server.

8. The operating state classification method according to claim 7, further including a step of storing additional learning data in which when the probability of a state determined by the neural network to be the most probable is higher than a preset value, the state label output by the neural network is given to intermediate data output by the pre-stage side of the neural network,
wherein in the additional learning step, the post-stage side of the neutral network is additionally learnt using the additional learning data.

9. The operating state classification method according to claim 7, further including a step of storing additional learning data in which when the probability of the state determined by the neural network to be the most probable is lower than the preset value, a correct state label input by a human being is given to the intermediate data output by the pre-stage side of the neutral network,
wherein in the additional learning step, the post-stage side of the neural network is additionally learnt using the additional learning data.

* * * * *